April 12, 1949.  C. O. PETERSON  2,467,049
SEAL FOR ROTATABLE MEMBERS
Filed Aug. 22, 1946

Inventor
Carl O. Peterson.
By Richmond S. Hayes
Attorney

Patented Apr. 12, 1949

2,467,049

UNITED STATES PATENT OFFICE 2,467,049

SEAL FOR ROTATABLE MEMBERS

Carl O. Peterson, Jamestown, N. Y., assignor to Marlin-Rockwell Corporation, Jamestown, N. Y., a corporation of New York Application August 22, 1946, Serial No. 692,229

4 Claims. (Cl. (286—5)

This invention relates to an improved seal for bearings or other relatively rotatable concentric members.

In its present form the invention is directed to the provision of a seal in the form of a ring-like disk that includes a resilient periphery adapted to seat against and be engaged with a suitable surface of the outer ring of a bearing and an inner flexible surface adapted to have sliding contact with a suitable portion of the inner ring of the bearing. It will be understood that the present illustration and description of the seal, as applied to a bearing having inner and outer rings, is intended to merely disclose one typical application of use.

Prior to this invention lubricant seals have included some form or other of resilient material for the purpose of effecting a yielding seal as between the bearing rings. Those in which the resilient material constituted the entire seal were required to be of considerable bulk which, in some instances, necessitated the use of specially designed outer rings. In other instances, a lubricant seal has been produced in the form of a disk-like ring of resilient material bonded to a split metal ring. Herein the seal could be collapsed for installation. The normal tendency of the split metal ring to open or expand served the purpose, when the seal was in place, of preventing inadvertent displacement.

Seals of the types above mentioned may serve in some bearings to fully retain a bearing lubricant. Generally speaking, however, the lack of uniformly radial pressure contact of the periphery of the seal of these types with the bearing renders them subject to failure as a complete enclosure and lubricant seal after a period of use, or following repeated installation and removal.

It is the purpose of the present invention to provide a satisfactory lubricant seal that, not only includes the advantages of strictly resilient engagement with suitable portions of the inner and outer rings of a bearing, but also provides a reinforcing ring that is so disposed as to render the bearing engaging portions capable of serving the intended purpose of providing sealing engagement both against the egress of lubricant and the ingress of foreign matter over a long period of time.

To this end it becomes a more particular object and advantage of the invention to provide a lubricant seal for bearings that, due to the nature of the interfitting of the seal with the bearing rings, the bearing oil or grease is retained adjacent the moving parts and dirt or dust excluded from those parts.

It is also an object of the invention to provide a lubricant seal that has only resilient pressure engagement with both rings of a bearing.

A further and most important object of the invention may be found in the provision of a lubricant seal that is so reinforced as to facilitate ready and repeated installation or removal thereof without distortion.

Additionally, it is of importance to provide a lubricant seal in which the ridigifying or reinforcing element thereof, by reason of its proportions and location, serves to create the desired resilient pressure engagement with the ring with which it is engaged, and the desired pressure contact with the ring with which it is intended to have sliding contact.

Other objects and advantages of the invention will be more fully understood from a consideration of the following specification, taken in conjunction with the accompanying drawing; and in which Fig. 1 is a perspective view of a ball bearing to which one form of the invention is applied;

Figures 1, 2:
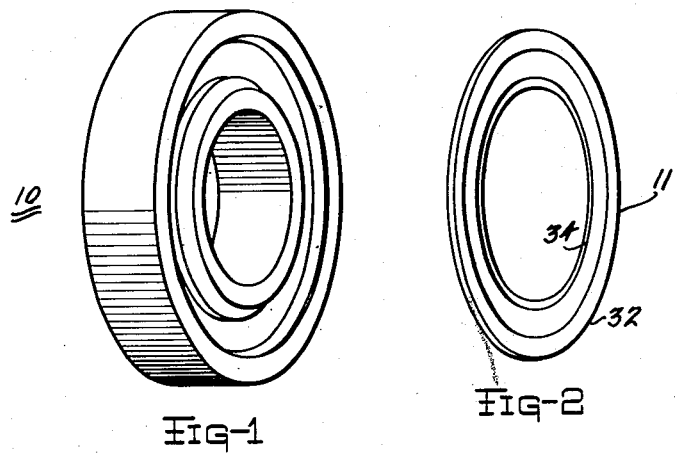
Fig. 2 is a perspective view of the form of lubricant seal adapted to be applied to the bearing shown in Fig. 1.
Figure 3:
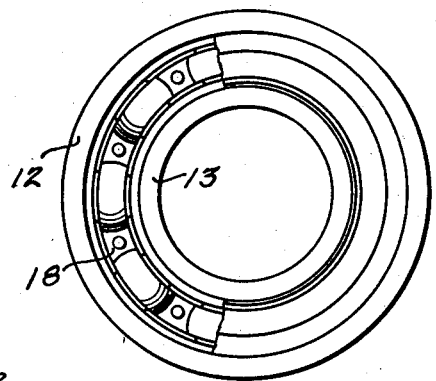
Fig. 3 is a side elevational view of the bearing, part of one of the lubricant seals being broken away to show its general disposition with respect to the inner and outer rings of the bearing.

Referring more particularly to the drawing, the reference numeral 10 is employed to generally designate a bearing in which a lubricant seal 11, embodying one form of the invention, is mounted. The bearing shown includes an outer ring 12 and an inner ring 13. Suitable balls 14 are adapted to move in the recesses 16 and 17 of the rings. These balls are held in proper relationship in a retainer 18; the arrangement of bearing rings, races, balls, and retainer being common practice. Inasmuch as the presently illustrated bearing shows the balls 14 and retainer 18 to be exposed on two sides of the bearing, such bearing will be provided with two lubricant seals 11. However, since these seals are identical, except for their reversed position, only one will be described in detail. The ring 13, from adjacent the ledge 19 which serves to define an edge of the race 17, is formed with a curved surface 21 that terminates at the vertical edge 22 of this ring. From the ledge 23 of the outer ring, an inclined surface 24 merges in a semi-circular recess 26. The other side of this recess is formed by a lip or ledge 27 that extends considerably inwardly of the base of said recess.

Figure 4:
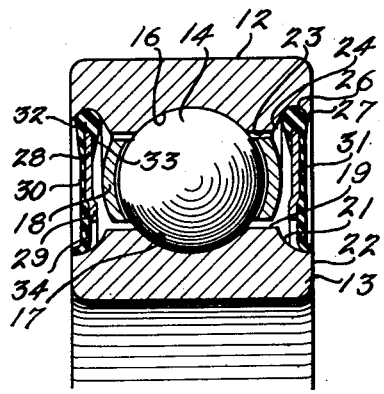
Fig. 4 is a greatly enlarged fragmentary sectional view showing the interfitting and sliding contact of one modification of the lubricant seal with the inner and outer rings of a bearing, together with the reinforcing structure thereof.

One form of the bearing seal 11 is shown in Fig. 4 of the drawing and consists of an unbroken, flat, thin, metal ring 28. Inasmuch as the ring is of light weight material and yet is intended to rigidify the entire seal, it may be found convenient to form an annular offset ledge 29, substantially as shown. Bonded to the ring 28 is an elastomeric material and in this form of the invention the material 30 constitutes an exterior coating along the flat surface 31 of the ring, terminating in a somewhat flared bead 32 at and about the ring's circumference. Since the bead 32 is centered with the ring, a certain portion 33 of the resilient material may be bonded to the inner ring face, substantially as shown, for the purpose of preventing improper relative distortion of the bead. The elastomeric material, 30, extends inwardly beyond the offset 29 of the ring to form a thin flexible flange 34. This flange is intended to conform to at least a part of the contour of the curved surface 21 of the inner ring.

When it is desired to install a lubricant seal of the type of the invention, it merely becomes necessary to first insert a comparatively small arcuate portion of the bead 32 in the recess 26. The remainder of the bead is then compressed and forced into the remainder of the recess. After the bead has been compressed so that it clears the annular shoulder 27 and enters the recess 26, it expands into place in the recess and the seal, in its entirety, adapts itself in a manner to seat the flexible flange 34 against the surface 21.

Figure 5:
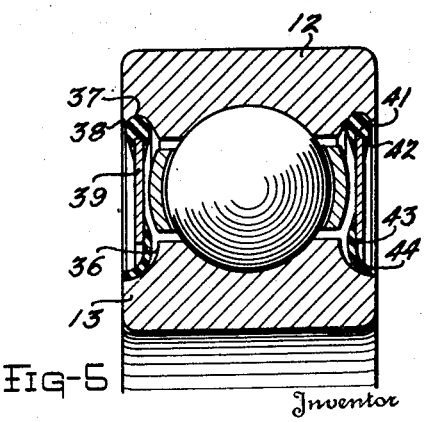
Fig. 5 is a further enlarged transverse sectional view showing a slight modification of the lubricant seal shown in Fig. 4.

In the modification of Fig. 5 the inner ring 13 of the bearing is shown to have a somewhat different curved surface 36 from the curved surface 21 previously described. Also, the recess 37 in the outer ring 12 may be somewhat shallower and, therefore, includes only a comparatively small shoulder 38. This seal also includes an unbroken, flat, metal ring 39, to the circumferential edge of which is bonded a bead 41 of elastomeric material. The bead is centered with respect to the ring and may include tapered, reinforcing portions 42, substantially as shown. A flat strip 43 of elastomeric material is bonded to the inner edge of the ring 39, preferably as shown, and includes a flexible portion 44 of such size that, when the seal is installed, this flexible portion will engage a relatively small part of the curved surface 36 of the inner ring. In this modification the flexible portion 44 has a greater area of contact with the inner ring than the flexible flange 34 of the previously discussed modification.

Although applicant has shown and described only two modifications of a lubricant seal for bearings, it will be apparent that other modifications or adaptations of the invention for use with other types of bearings may be made and are contemplated insofar as such modifications or adaptations are within the spirit and scope of the annexed claims.

Having thus set forth my invention what I claim as new and for which I desire protection by Letters Patent is:

1. A seal adapted to span the space between a pair of relatively rotatable concentric members one of which has a marginally located annular recess radially facing the other of said members, said seal comprising a bead-like ring of elastomeric material fitting the walls of said recess under radial pressure, a separate sealing ring engaging the other of said members and being radially spaced from said bead-like ring and having a portion concentric therewith, and a rigid continuous disk-like annulus bridging the space between the rings and being adhesively bonded thereto, said annulus terminating short of the mouth of said recess.

2. A seal as set forth in claim 1 in which the annulus is of thin sheet metal of uniform thickness, and has a portion in radial alignment with the central part of said bead-like ring.

3. A seal as set forth in claim 1 in which the rings are completely separated by said annulus on both sides of said seal.

4. A seal adapted to span the space between a pair of relatively rotatable concentric members the outer one of which has a marginally located annular recess radially facing the inner member, said seal comprising an outer bead-like ring of elastomeric material fitting the walls of said recess under radial pressure, a separate inner sealing ring engaging the inner member and being radially spaced from said bead-like ring and having a portion concentric therewith, and a rigid continuous disk-like annulus bridging the space between the rings and being adhesively bonded thereto, said annulus terminating short of the mouth of said recess.

CARL O. PETERSON.

REFERENCES CITED

The following references are of record in the file of this patent:

UNITED STATES PATENTS

| Number | Name | Date |
|---|---|---|
| 2,106,293 | Christenson | Jan. 25, 1938 |
| 2,120,922 | Rasmussen | June 14, 1938 |
| 2,202,770 | Brodin | May 28, 1940 |
| 2,246,471 | Searles | June 17, 1941 |

FOREIGN PATENTS

| Number | Country | Date |
|---|---|---|
| 544,881 | Great Britain | 1942 |
| 551,152 | Great Britain | 1943 |